United States Patent
Kapp et al.

(10) Patent No.: US 9,778,056 B2
(45) Date of Patent: Oct. 3, 2017

(54) SYSTEM AND METHOD FOR DISPLAYING PLANNED SPEED VALUES

(71) Applicant: GENERAL ELECTRIC COMPANY, Schenectady, NY (US)

(72) Inventors: Kevin L. Kapp, Melbourne, FL (US); Samuel William Golden, Melbourne, FL (US)

(73) Assignee: General Electric Company, Schenectady, NY (US)

(*) Notice: Subject to any disclaimer, the term of this patent is extended or adjusted under 35 U.S.C. 154(b) by 49 days.

(21) Appl. No.: 14/501,489

(22) Filed: Sep. 30, 2014

(65) Prior Publication Data

US 2016/0091320 A1    Mar. 31, 2016

(51) Int. Cl.
| | | |
|---|---|---|
| G05D 1/00 | (2006.01) | |
| G05D 3/00 | (2006.01) | |
| G06F 7/00 | (2006.01) | |
| G06F 17/00 | (2006.01) | |
| G01C 21/36 | (2006.01) | |
| B61L 3/00 | (2006.01) | |
| B61L 3/16 | (2006.01) | |
| B61L 25/00 | (2006.01) | |
| B61L 23/00 | (2006.01) | |
| B61L 25/02 | (2006.01) | |

(52) U.S. Cl.
CPC .............. *G01C 21/36* (2013.01); *B61L 3/006* (2013.01); *B61L 3/008* (2013.01); *B61L 3/16* (2013.01); *B61L 23/00* (2013.01); *B61L 23/005* (2013.01); *B61L 25/00* (2013.01); *B61L 25/02* (2013.01); *B61L 25/021* (2013.01)

(58) Field of Classification Search
None
See application file for complete search history.

(56) References Cited

U.S. PATENT DOCUMENTS

| | | | | |
|---|---|---|---|---|
| 2006/0055565 | A1* | 3/2006 | Kawamata et al. | 340/995.13 |
| 2010/0023190 | A1* | 1/2010 | Kumar | B61L 3/006 |
| | | | | 701/20 |
| 2012/0136515 | A1 | 5/2012 | Noffsinger et al. | |

FOREIGN PATENT DOCUMENTS

EP        2037219 A1 *  3/2009  ............ G01C 21/34

* cited by examiner

*Primary Examiner* — Lail Kleinman
(74) *Attorney, Agent, or Firm* — Global Patent Operation; John A. Kramer

(57) ABSTRACT

A method and system are provided to obtain, with one or more processors, a speed profile of a vehicle system for a designated route traveled by the vehicle system. The designated route includes a plurality of segments, and the speed profile includes a planned segment speed for each segment. One or more planned segment speeds are identified that correspond to a point of interest, and respective priorities are assigned to the identified segment speeds based on the point of interest forming prioritized segment speeds. First discrete numeral values are displayed on a display, representing the planned segment speeds of the prioritized segments that are within a predetermined distance forward of a motion of the vehicle system. Second discrete numeral values are displayed on the display, corresponding to remaining segment speeds that are within the predetermined distance, until a predetermined threshold of discrete numeral values is reached.

20 Claims, 7 Drawing Sheets

| SEGMENT | PLANNED SPEED | ALLOWED SPEED |
|---|---|---|
| 1 | 25 | 35 |
| 2 | 30 | 35 |
| 3 | 25 | 25 |
| 4 | 32 | 50 |
| 5 | 32 | 50 |
| 6 | 40 | 50 |
| 7 | 45 | 50 |
| 8 | 45 | 50 |
| 9 | 50 | 60 |
| 10 | 54 | 60 |
| 11 | 50 | 50 |
| 12 | 40 | 40 |
| 13 | 40 | 40 |
| 14 | 30 | 35 |
| 15 | 30 | 35 |
| 16 | 25 | 30 |
| 17 | 30 | 30 |
| 18 | 40 | 40 |
| 19 | 40 | 50 |
| 20 | 48 | 50 |
| 21 | 50 | 50 |
| 22 | 50 | 50 |
| 23 | 40 | 40 |
| 24 | 35 | 35 |
| 25 | 35 | 35 |
| 26 | 30 | 30 |
| 27 | 30 | 30 |
| 28 | 30 | 30 |
| 29 | 25 | 25 |
| 30 | 20 | 25 |

FIG. 5

SYSTEM AND METHOD FOR DISPLAYING PLANNED SPEED VALUES

FIELD

Embodiments of the subject matter disclosed herein relate to displaying planned speed values based on a trip plan of a vehicle system.

BACKGROUND

A vehicle system may include one or more powered vehicles that may be mechanically or otherwise linked (directly or indirectly) to non-powered vehicles. The powered and non-powered vehicles of the vehicle system may travel as a group according to a trip plan within a transportation network. The trip plan may include a designated route with speed information indicating a planned or predicted speed of the vehicle system while traveling within the segments of the designated route. The speed information may include a series of discrete numerical values displayed along a graphical display of the designated route for a set distance in front of the vehicle system, such as, on an operator display.

For example, the North American Interoperable Train Control committee has approved of a standard interface display for use by operators in rail vehicle systems. The standard interface displays limit the amount of speed information displayed to the operator. This limitation restricts the amount of speed information to a set number of discrete numerical values (e.g., twelve). The numerical values are displayed consecutively corresponding to the order of the segments along the designated route with respect to a distance from the vehicle system. The standard interface does not address other criteria for which speed information is displayed for the designated route. Thus, planned or predicted speeds at predetermined locations of interest (e.g., locations with reduction in speed limit or damaged sections of the track) along the designated route may not be displayed.

BRIEF DESCRIPTION

In one embodiment, a method includes obtaining, with one or more processors, a speed profile of a vehicle system for a designated route traveled by the vehicle system. The designated route includes a plurality of segments, and the speed profile includes a planned segment speed for each segment. The method includes identifying, with one or more processors, one or more planned segment speeds that correspond to a point of interest, and assigning a priority to the identified segment speeds based on the point of interest forming prioritized segment speeds. The method also includes displaying first discrete numeral values representing the planned segment speeds of the prioritized segments that are within a predetermined distance forward of a motion of the vehicle system. Further, the method includes backfilling the display with second discrete numeral values corresponding to remaining segment speeds that are within the predetermined distance until a predetermined threshold of discrete numeral values are reached.

Optionally, the point of interest of the method may correspond to a second segment having an allowed segment speed lower than the planned segment speed of an adjacent first segment that is traveled by the vehicle system before the second segment.

In another embodiment, a system is provided that includes a display and a non-transitory memory. The memory is configured to store a speed profile for a designated route. The designated route includes a plurality of segments, wherein the speed profile includes a planned segment speed for each segment. The system includes a controller having one or more processors. The controller is programmed to operate in response to instructions stored on the non-transitory memory. The controller is programmed to identify one or more planned segments speeds from the speed profile that corresponds to a point of interest. The controller is further programmed to assign a priority to the identified segment speeds based on the point of interest forming prioritized segment speeds, and to instruct the display to display first discrete numeral values representing the planned segment speeds of the prioritized segments that are within a predetermined distance forward of a motion of the vehicle system. The controller is also programmed to backfill the display with second discrete numeral values corresponding to remaining segment speeds that are within the predetermined distance until a predetermined threshold of discrete numeral values are reached.

In another embodiment, a method is provided. The method includes receiving, using one or more processors, a trip plan that includes a speed profile for a vehicle system. The speed profile includes two or more segments each having a planned segment speed and an allowed segment speed. The method includes iteratively comparing, using the one or more processors, the planned segment speed of a first segment and the allowed segment speed of an adjacent second segment to identify segments having allowed segment speeds lower than the planned speed of an adjacent segment. The method includes assigning, using the one or more processors, a priority to the planned segment speeds of the identified segments. The method includes displaying, using the one or more processors, the prioritized planned segment speeds as discrete numerals on a graphical representation of the trip plan on a display. The method includes backfilling, using the one or more processors, the graphical representation of the trip plan with the remaining planned segment speeds of the speed profile until a predetermined threshold is reached.

BRIEF DESCRIPTION OF THE DRAWINGS

The present inventive subject matter will be better understood from reading the following description of non-limiting embodiments, with reference to the attached drawings, wherein below:

FIG. 5 is a speed profile from a trip plane, in accordance with an embodiment;

DETAILED DESCRIPTION

One or more embodiments herein describe systems and methods for displaying selected subsets of speed information from a trip plan for a vehicle system. The speed information may include the various speeds or velocities the vehicle system is adjusted to when traveling along corresponding segments within the trip plan. An operator display may be used in operation of the vehicle system while following the trip plan. The operator display may display a series of numerical values representing the speed information. The display may be limited in the number of numerical values such that not all of the speed information can be displayed. At least one embodiment herein describes a system and/or method for prioritizing a subset of the speed information representing points of interest within a trip plan. For example, a controller may prioritize selected subsets of the speed information that correspond to a point of interest. The selected subsets are displayed while the remaining speed information may be backfilled by the controller until the numerical value limit is reached. The points of interest may be segments within the trip plan that correspond to a reduction of speed for the vehicle system, for example, a reduction in a speed limit between adjacent segments.

At least one technical effect of various embodiments described herein may include reducing the effort required from the operator to determine the planned or predicted speed at points of interest from the trip plan. Allowing the operator to spend more time monitoring the route in front of the vehicle system and less time evaluating the planned or predicted speeds on the display screen. Another technical effect may include making it easier to quickly convey planned or predicted speed information to the operator of the vehicle system via quick glances at the display when the energy management system is constrained to display this information as a series of discrete numerical values. Another technical effect may include a more user friendly interface between the operator and the energy management system.

While the discussion and figures included herein may be interpreted as focusing on rail vehicle consists (e.g., trains) as the vehicle systems, it should be noted that not all embodiments of the subject matter herein described and claimed herein are limited to trains and railroad tracks. (A consist is a group of vehicles that are mechanically linked to travel together.) The inventive subject matter may apply to other vehicles, such as airplanes, ships, or automobiles or the like.

Figure 1:
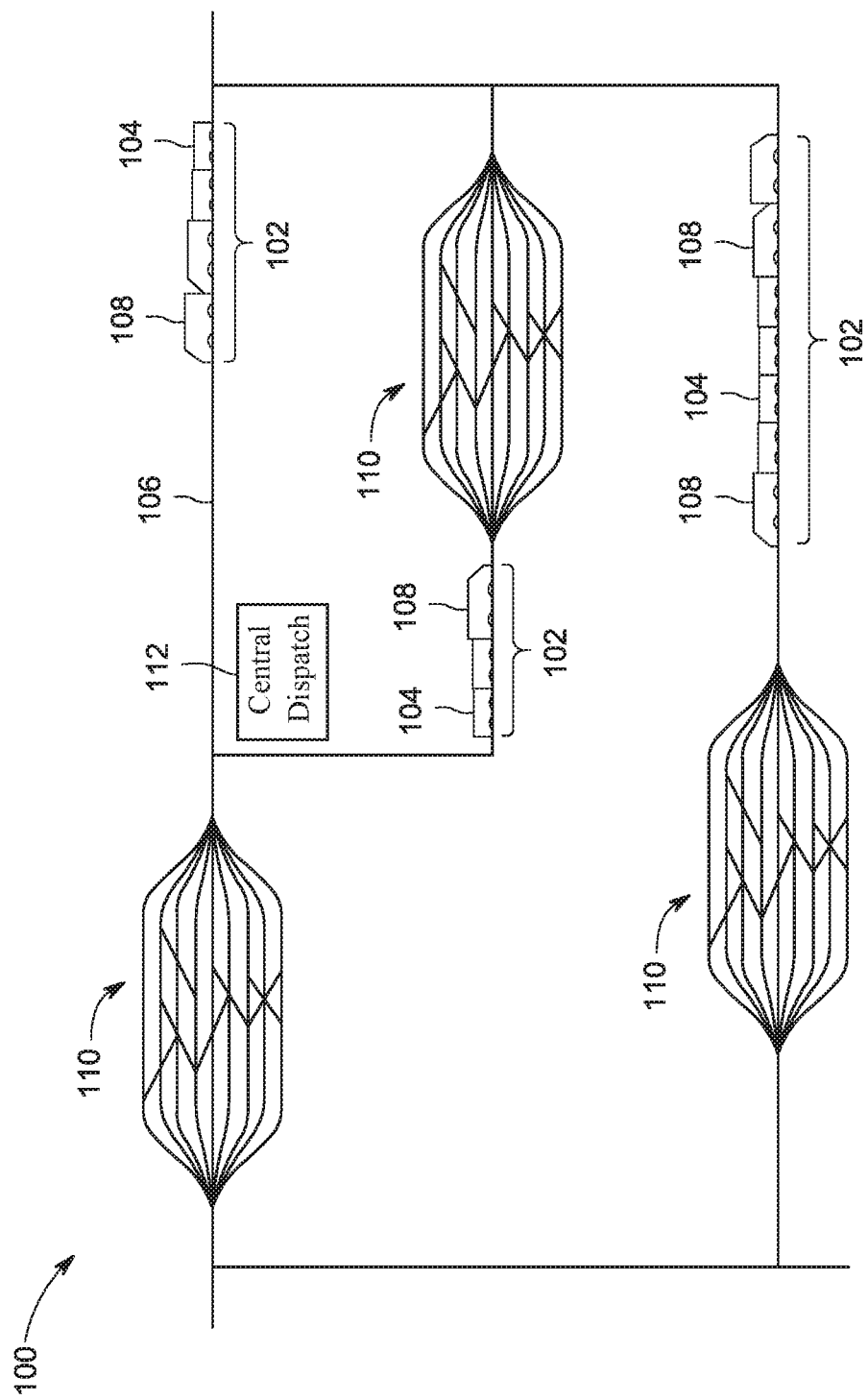
FIG. 1 is a schematic diagram of a transportation network of an embodiment.

FIG. 1 is a schematic diagram of an embodiment of a transportation network 100. The transportation network 100 includes a plurality of interconnected routes 106, such as railroad tracks, roads, ship lanes, or other paths across which a vehicle system 102 travels. The routes 106 may be referred to as main line routes when the routes 106 provide paths for the vehicle systems 102 to travel along in order to travel between a starting location and a destination location (and/or to one or more intermediate locations between the starting location and the destination location). The transportation network 100 may extend over a relatively large area, such as hundreds of square miles or kilometers of area. While only one transportation network 100 is shown in FIG. 1, one or more other transportation networks 100 may be joined with and accessible to vehicles traveling in the illustrated transportation network 100. For example, one or more of the routes 106 may extend to another transportation network 100 such that vehicles can travel between the transportation networks 100. Different transportation networks 100 may be defined by different geographic boundaries, such as different towns, cities, counties, states, groups of states, countries, continents, or the like. The number of routes 106 shown in FIG. 1 is meant to be illustrative and not limiting on embodiments of the described subject matter. Moreover, while one or more embodiments described herein relate to a transportation network formed from railroad tracks, not all embodiments are so limited. One or more embodiments may relate to transportation networks in which vehicles other than rail vehicles travel, such as flights paths taken by airplanes, roads or highways traveled by automobiles, waterborne shipping paths (e.g., shipping lanes) taken by ships, or the like.

Several vehicle systems 102 travel along the routes 106 within the transportation network 100 according to a trip plan. The vehicle systems 102 may concurrently travel in the transportation network 100 along the same or different routes 106. Travel of one or more vehicle systems 102 may be constrained to travel within the transportation network 100. Alternatively, one or more of the vehicle systems 102 may enter the transportation network 100 from another transportation network or leave the transportation network 100 to travel into another transportation network.

The trip plan, further described herein, instructs the vehicle system 102 on a designated route of travel through the transportation network 100, projected or planned speeds, and for scheduling information (e.g., arrival times, destination times) of the vehicle system 102 as the vehicle system 102 travels within the transportation network 100. The projected or planned speed information may be included in a speed profile of the trip plan. The trip plan may be generated by the vehicle system 102 or received by the vehicle system 102 from one or more central dispatch facilities 112. In one embodiment, the trip plan designates speeds of the vehicle system 102 as a function of time and/or distance along the route 106.

In the illustrated embodiment, the vehicle systems 102 are shown and described herein as rail vehicles or rail vehicle consists. However, one or more other embodiments may relate to vehicles other than rail vehicles or rail vehicle consists. For example, the vehicle systems can represent other off-highway vehicles (e.g., vehicles that are not designed or permitted to travel on public roadways), marine vessels, airplanes, automobiles, and the like. While three vehicle systems 102 are shown in FIG. 1, alternatively, a different number of vehicle systems 102 may be concurrently traveling in the transportation network 100 (e.g., more than three, less than three).

Additionally or alternatively, the vehicle system 102 may include one or more propulsion generating vehicles (PGV) 108 (e.g., locomotives or other vehicles capable of self-propulsion) and/or one or more cargo-carrying vehicles (CCV) 104. The CCV 104 is a non-propulsion-generating vehicle, such as cargo cars, passenger cars, or other vehicles incapable of self-propulsion. In at least one embodiment, the PGV 108 and the CCV 104 are mechanically coupled or linked together to form the vehicle system 102 (e.g., a consist) to travel or move along the routes 106. The routes 106 are interconnected to permit the vehicle systems 102 to travel over various combinations of the routes 106 to move from a starting location to a destination location and/or an intermediate location there between.

The transportation network 100 may include one or more vehicle yards 200. While three vehicle yards 110 are shown, alternatively, the transportation network 100 may include a different number of vehicle yards 110. The vehicle yards 200 are located along the routes 106 in order to provide services to the vehicle systems 102, such as to repair or maintain the one or more PGV 108, re-order the sequence of vehicle systems 102 traveling along the routes 106 by adjusting an order to which the vehicle systems 102 exits the vehicle yard 110 relative to the order of the vehicle systems 102 entering vehicle yard 110, partitioning and storing the one or more PGV 108 and/or CCV 104 of the vehicle system 102, load or couple additional CCV 104 and/or PGV 108 onto the vehicle system 102, or the like.

Figure 2:
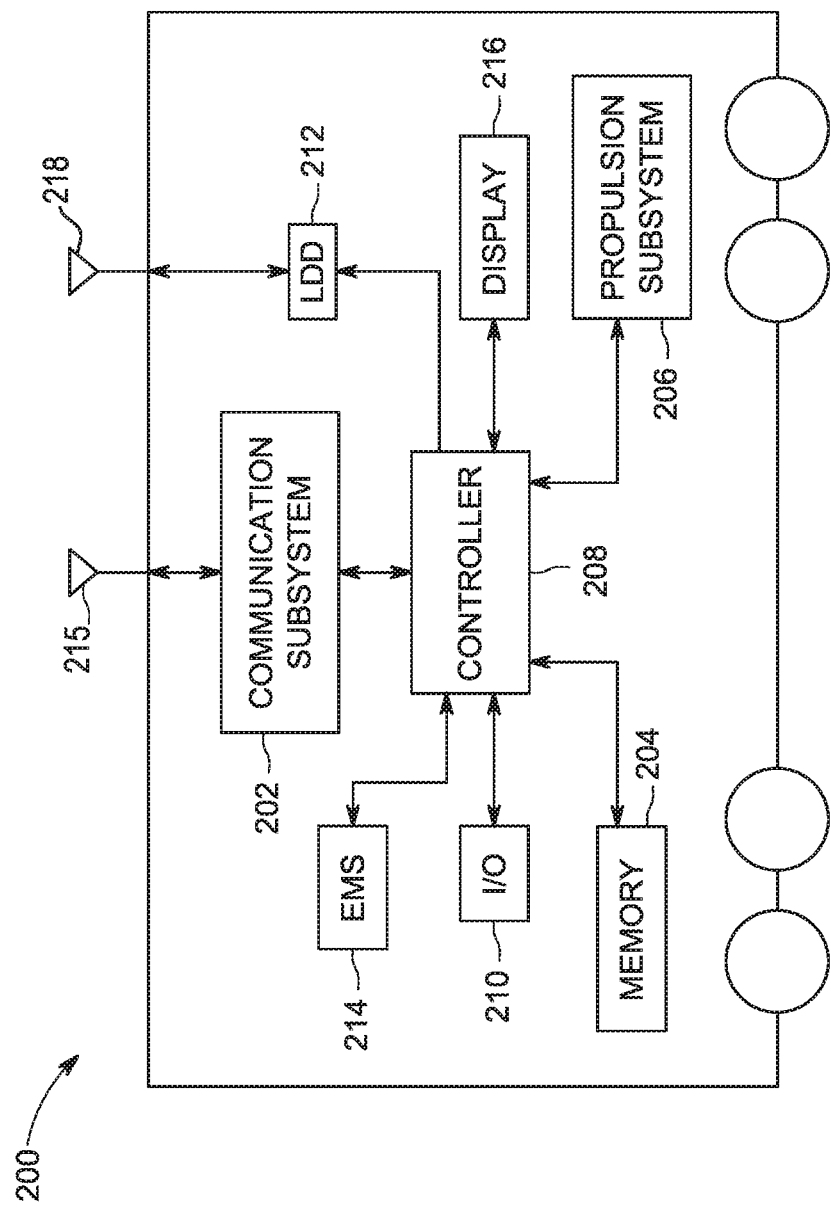
FIG. 2 is a schematic diagram of a vehicle system, in accordance with an embodiment.

FIG. 2 is a schematic diagram of a vehicle system 200, in accordance with an embodiment. It should be noted that although FIG. 2 illustrates the vehicle system 200 as a single propulsion-generating vehicle (e.g., PGV 108), in other embodiments the vehicle system 200 may include more than one PGV 108 and/or one or more non-propulsion vehicles (e.g., CCV 104). The vehicle system 200 may include a communication subsystem 202, a memory device 204, a propulsion subsystem 206, a controller 208, an input/output (I/O) device 210, a display 216, energy management subsystem 214, and a location determining device 212. These components may communicate with each other via wired and/or wireless connections. Additionally or alternatively, the vehicle system 200 may include one or more components in addition to the listed components and/or one or more of the listed components may be included on a different vehicle that is communicatively coupled to the vehicle system 200 (e.g., central dispatch facility 112).

The communication subsystem 202 includes an antenna 215 that is electrically coupled to a transceiver or a separate transmitter and receiver. The communication subsystem 202 is configured to wirelessly communicate, bi-directionally, with off-board locations, such as the central dispatch facility 112 (shown in FIG. 1). For example, the communication subsystem 202 may be used to receive the trip plan from the central dispatch facility 112.

The memory device 204 is an electronic storage device configured to store trip data, for example, the trip plan, speed profile, location information or the like. Optionally, the memory device 204 may be configured to store route 106 information of the transportation network 100, such as, speed limits within the transportation network 100, grade information of various segments of routes 106, emission limits, traffic information received by the communication subsystem 202 or the like. The contents of the memory device 204 may be accessed by the controller 208, a user via the I/O device 210, the communication subsystem 214, the energy management subsystem 214, or the like.

The propulsion subsystem 206 is configured to provide tractive efforts to propel the vehicle system 200 along the route 106. The propulsion subsystem 206 may include one or more engines and/or motors, wheels, fins, or treads that engage the track material, and also a fuel or power source that energizes the engines and/or motors. The propulsion subsystem 206 may be associated with a braking subsystem (not shown) that is configured to slow movement of the vehicle system 200 and/or prohibit movement of the vehicle system 200 completely when actuated.

The I/O device 210 is configured to receive input information from one or more user devices, such as a keyboard, a mouse, a hand-held device (e.g., cell phone, tablet, PDA, etc.), touchscreen, and/or a graphical user interface of the display 216. The I/O device 210 may transmit the input information to the controller 208 for processing. For example, a user (e.g., operator of the crew on the vehicle system 200) may initialize a trip using the I/O device 210. Initializing a trip notifies the controller 208 that the user desires controlling the movement of the vehicle system 200 based on the trip plan.

The display 216 may display trip plan information, the speed profile, charts, graphs, and/or other indicia for the user of the vehicle system 200. For example, the display 216 may display the planned or predicted speed of the vehicle system 200 for various segments of the designated route of the trip plan. The display 216 may be an LCD (liquid crystal display), plasma display, CRT monitor, or the like. Optionally, the display 216 may include a touch sensitive surface (e.g., sensor or set of sensors that accepts input from a user based on haptic and/or tactile contact) which may be used as a part of the I/O device 210. For example, the display 216 may display a graphical user interface which is interfaced by the user by interacting with the touch sensitive surface.

The location determining device 212 is configured to track the movement of the vehicle system 200 along the route 106. For example, the location determining device 212 may include a receiver, antenna 218, and associated circuitry for receiving wireless signals representative of the location, speed, and/or heading of the vehicle system 200. The location determining device 212 may use global positioning system technology (GPS) to communicate with orbiting GPS satellites. The location determining device 212 may compare received communications from multiple satellites to determine the location of the device 212. The location of the vehicle system 200 may be determined in coordinates. Alternatively, the location determining device 212 may communicate with sensors or markers along the route 106 to determine the location of the vehicle system 200 along the route 106. The location determining device 212 may include wireless transceiver hardware and circuitry to triangulate the location of the vehicle system along the route using wireless signals. Furthermore, the data from multiple sensors may be used by the location determining device 212 to provide a more accurate location. Optionally, the location determining device 212 may be used to provide a more accurate velocity or speed of the vehicle system 200 based on the change in location of the vehicle system 200 over time. The location determining device 212 may be used by the controller 208 to determine the location of the vehicle system 200 continuously, or at various times along a trip, in order to determine the position of the vehicle system 200 relative to the trip plan.

The controller 208 controls the operation of the vehicle system 200. The controller 208 may be embodied in hardware, such as a processor, controller, or other logic-based device, that performs functions or operations based on one or more sets of instructions (e.g., software). The instructions on which the hardware operates may be stored on a tangible and non-transitory (e.g., not a transient signal) computer readable storage medium, such as a memory 204. The memory 204 may include one or more computer hard drives, flash drives, RAM, ROM, EEPROM, or the like. Alternatively, one or more of the sets of instructions that direct operations of the hardware may be hard-wired into the logic of the hardware. The controller 208 may be used in conjunction with the energy management subsystem 214 to control the propulsion subsystem 206 and braking subsystem. Optionally, the controller 208 may generate a trip plan by accessing information of the transportation network 100 (e.g., speed limits within the transportation network 100, grade information of various segments of routes 106, emission limits, traffic information received by the communication subsystem 202) stored on the memory device 204.

The energy management subsystem 214, communicating with the controller 208, controls operations of the propulsion subsystems 206 of the vehicle system 200 adhering to the trip plan. The energy management subsystem 214 may be embodied in hardware, such as a processor, controller, or other logic-based device, that performs functions or operations based on one or more sets of instructions (e.g., software). The instructions on which the hardware operates may be stored on a tangible and non-transitory (e.g., not a transient signal) computer readable storage medium, including one or more computer hard drives, flash drives, RAM, ROM, EEPROM, or the like. Alternatively, one or more of the sets of instructions that direct operations of the hardware may be hard-wired into the logic of the hardware. Optionally, the energy management subsystem 214 may control the propulsion subsystem 206 directly. The trip plan of the vehicle system 200 includes the travel of the vehicle system 200 along the route 106 from a starting location to a destination location. The energy management subsystem 214 can refer to the trip plan that includes information related to the vehicle system 200 (e.g., amount of tractive effort, efficiency of propulsion), the route 106, the geography over which the route 106 extends, and other information in order to control the tractive efforts of the vehicle system 200 (e.g., based on the one or more PGV 108 of the vehicle system 200).

The energy management subsystem 214 may communicate with the propulsion subsystem 206 to change the tractive effort as the vehicle system 200 travels over different segments of the designated route of the trip plan. For example, if the vehicle system 200 is approaching a steep incline and the trip profile indicates that the vehicle system 200 is carrying significantly heavy cargo, then the energy management subsystem 214 may direct the vehicle system 200 to increase the tractive efforts supplied by the propulsion subsystem 206. Conversely, if the vehicle system 200 is carrying a smaller cargo load based on the trip profile, then the energy management subsystem 214 may direct the propulsion subsystem 206 to increase the supplied tractive efforts by a smaller amount than the tractive efforts would otherwise be increased if the data indicated a heavier cargo load. The energy management subsystem 214 may notify the user of the operating actions, such as, to increase tractive effort, by displaying a message on the display 216.

The tractive efforts may be changed in response to other factors, such as changes in the route that the vehicle system 200 travels along, regulatory requirements (e.g., emission limits) of the regions through which the vehicle system 200 travels within the transportation network 100, and the like, based on the trip plan. For example the active efforts may be changed due to at or below allowed speeds (e.g., vehicle system 200 speed limits) while traveling along segments along the designated route The trip plan may be received by the vehicle system 200 from the communication subsystem 202 or generated by the controller 208. The trip plan includes the operating parameters or orders for the vehicle system 200 executed by the energy management subsystem 214. The parameters include the tractive and braking efforts expressed as a function of location of the vehicle system 200 along the trip, distance along the designated route, speed of the vehicle system 200, and/or time, as defined by the upcoming segment of the route. The trip plan optionally may also include additional information, such as suggested primary and secondary routes, time schedule (e.g., departure times, arrival times), energy usage, the allowed speed of a segment, and the like. In one aspect, the trip plans can designate the operational settings so that travel of a vehicle system 200 according to the trip plan causes the vehicle system 200 to consume less fuel and/or generate fewer emissions than the vehicle system 200 traveling along the same designated route with different operational settings. The trip plan may be established using an algorithm based on models for vehicle behavior for the vehicle system 200 along the designated route.

In an embodiment, the memory 204 may store a software application, executed by the controller 208 and/or energy management subsystem 214, such as the Trip Optimizer™ system provided by General Electric Company, or another energy management system. For additional discussion regarding trip plans (e.g., trip profiles), see U.S. patent application Ser. No. 12/955,710, Publication No. 2012/0136515, "Communication System for a Rail Vehicle Consist and Method for Communicating with a Rail Vehicle Consist," filed 29 Nov. 2010, the entire contents of which are incorporated herein by reference. The Trip Optimizer™ system can create a trip profile that can reduce braking of the rail vehicle by learning the rail vehicle's characteristics and calculating an efficient way of running the rail vehicle by considering factors such as the length and weight of the rail vehicle, the grade of the route that the rail vehicle will be traversing, conditions of the track that the rail vehicle will be traveling along, weather conditions, and performance of the rail vehicle. During the trip, the propulsion subsystem is at least partially controlled by the Trip Optimizer™ system to propel the rail vehicle along its route according to the trip profile.

Figure 3A:
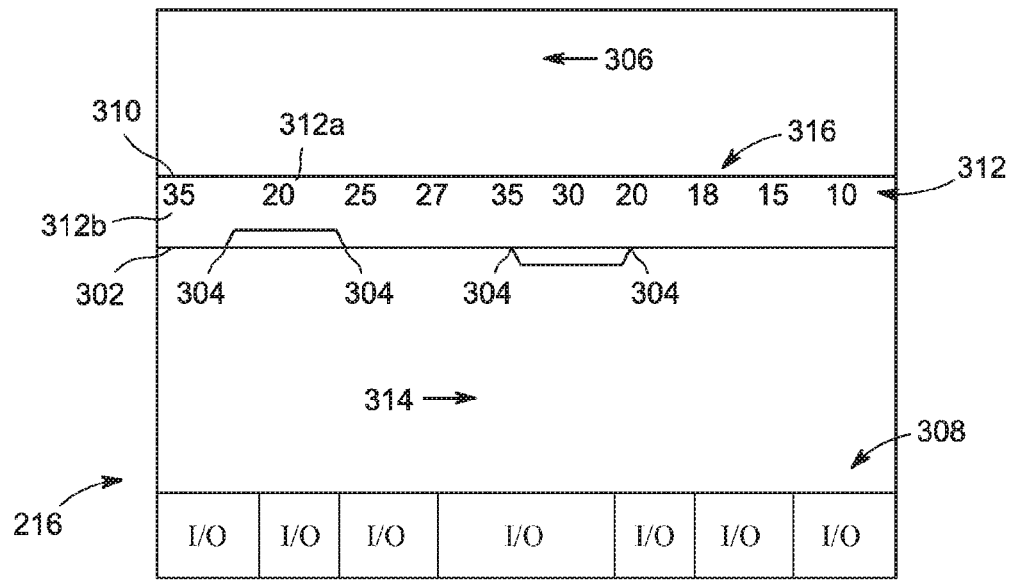
FIG. 3A is an illustration of a display of the vehicle system in FIG. 2.
Figure 3B:
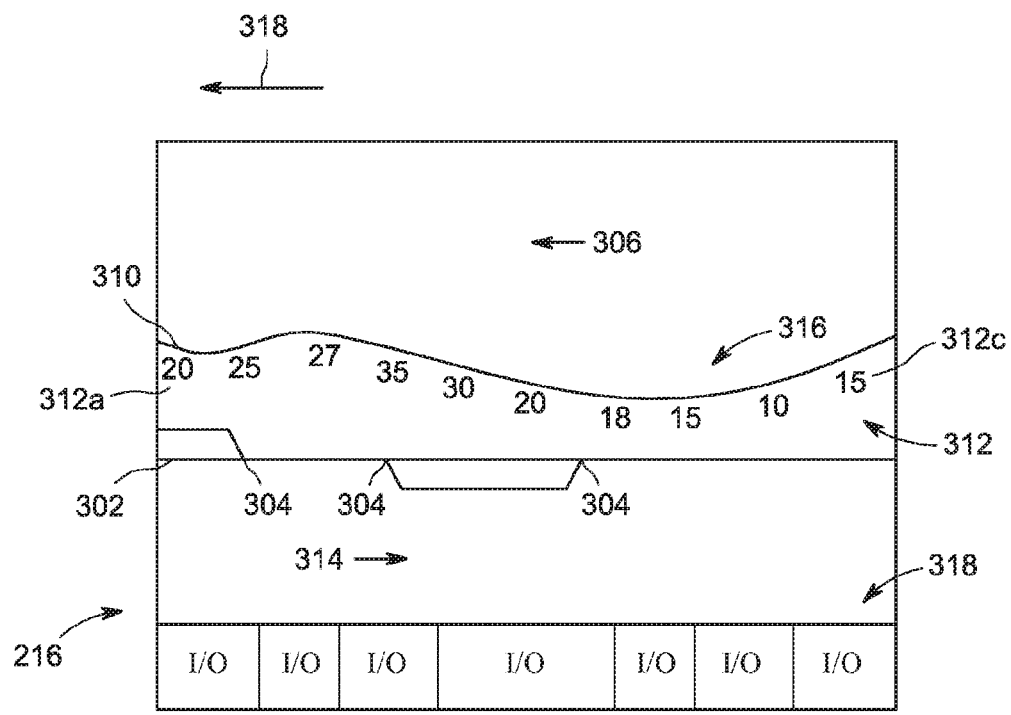
FIG. 3B is an illustration of a display of the vehicle system in FIG. 2.

FIGS. 3A-B are illustrations of the display 216, in accordance with an embodiment. The display 216 may include a graphical user interface with user interface I/O 308 on the lower portion of the display 216. It should be noted that in other embodiments the user interface I/O 308 may be positioned on the upper portion of the display 216, side portions of the display 216, or at various other locations within the display 216. The display 216 may also include status sections 306 and 314. The status sections 306 and 314 may indicate various location information, for example, route distance markers, route conditions, distance to destination, or the like, based on the location data received by the location determining device 212. Optionally, the location information may be based on a calculated distance from the speed of the vehicle system 200 as the vehicle system 200 travels along the designated route of the trip plan. The status sections 306 and 314 may also include the instantaneous speed, amount of tractive effort, breaking pressure, or the like, of the vehicle system 200.

The display 216 may also include a graphical representation 302 of the designated route and a graphical representation 316 of the trip plan traveled by the vehicle system 200. The graphical representations 302 and 316 may illustrate the trip plan and designated route at a predetermined distance from the vehicle system 200. For example, the graphical representations 302 and 316 may display the trip plan and designated route fifteen miles ahead or forward of the vehicle system 200 relative to a momentum or motion of the vehicle system 200. It should be noted that in other embodiments, the graphical representations 302 and 316 may display the trip plan and/or designated route less than or greater than fifteen miles. Optionally, the predetermined distance may be based on the speed of the vehicle system 200 such that the predetermined distance may increase or decrease when the speed of the vehicle system 200 increases or decreases, respectively.

The graphical representation 316 may also include one or more discrete numerals 312. The discrete numerals 312 represent the speed profile of the vehicle system 200 corresponding to "discrete" (e.g., detached, distinct, separate) individual segments of the designated route. Each of the discrete numerals 312 represent the planned or projected speed of the vehicle system 200 at the corresponding segment to conform to the trip plan. It should be noted that the discrete numerals 312 may not represent all of the different speeds within the predetermined distance.

The controller 208 may limit the number of discrete numerals 312 to a predetermined threshold (e.g., twelve discrete numerals, fifteen discrete numerals). The controller 208 may prioritize discrete numerals 312 representing segments of the designated route at points of interest within the predetermined distance. The points of interest may correspond to a segment having a reduced allowed speed (e.g., speed limit) compared to the planned speed of an adjacent segment in the speed profile. Optionally, the points of interest may correspond to segments located at a crest of a hill, a bottom of a hill, manual control zones, or the like. The discrete numerals 312 prioritized by the controller 208 may be included in a speed display database. The remaining discrete numerals 312 within the predetermined distance, not prioritized by the controller 208, may be backfilled or added to the speed display database until the predetermined threshold is reached. Once the predetermined threshold is reached, the controller 208 may display the discrete numerals 312 included in the display database.

Optionally, the controller 208 may backfill or add remaining discrete numerals 312 at predetermined increments from the vehicle system 200 that were not prioritized by the controller 208. For example, the display 216 may be able to display a predetermined amount of discrete numerals 312. The controller 208 selects and displays the prioritized discrete numerals 312 on the display 216, which may be fewer than the predetermined amount able to be displayed by the display 216. Once the prioritized discrete numerals 312 are displayed, the controller 208 may select one or more of the remaining discrete numerals 312 to be added to the display (e.g., backfill) until the predetermined amount is reached. Optionally, the remaining discrete numerals 312 may be selected based on a distance from the vehicle system 200, for example, correspond to half mile increments from the vehicle system 200. It should be noted that in other embodiments the increments may be lower than (e.g., quarter mile) or greater than a half mile.

Optionally, the controller 208 may accentuate the discrete numerals 312 corresponding to points of interest on the display relative to other information shown on the display. For example, the controller 208 may display the discrete numerals 312, prioritized by the controller 208, at a different color than the discrete numerals not representing points of interest, incrementally flash the discrete numeral, or the like.

As the vehicle system 200 travels along the designated route, the graphical representations 302 and 316 may refresh or scroll the display of the trip plan and designated route (e.g., to the left or right) based on the speed of the vehicle system 200 continuously (e.g., smooth scrolling) such that the scroll rate represents a rate of the distance traveled by the vehicle system 200. The refresh or scrolling of the graphical representations 302 and 316 maintains the predetermined distance of the graphical representations 302 and 316 forward of the vehicle system 200 as the vehicle system 200 travels along the designated route.

For example, while the vehicle system 200 is stopped, the graphical representations 302 and 316 may show a static or still image of the trip plan and the designated route as shown in FIG. 3A. The operator, via the I/O device 210 may instruct the propulsion subsystem 206 to provide tractive effort, which moves the vehicle system 200. As the vehicle system 200 moves along the designated route, the graphical representations 302 and 316 will scroll the trip plan and the designated route in the direction of the arrow 318 removing trip plan and the designated route information that have already been traveled by the vehicle system 200 and adding newly displayed trip plan and designated route information that is within the predetermined distance forward of the vehicle system 200, as shown in FIG. 3B.

The scrolling of the graphical representations 302 and 316 allow the user to continuously view the trip plan and designated route information forward of the vehicle system 200 (e.g., up to the predetermined distance) as the vehicle system 200 travels past the various segments of the designated route. For further example, discrete numerals 312a-b are shown in the graphical representation 316 are scrolled or shifted in the direction of the arrow, while the vehicle system 200 is traveling along the designated route. The discrete numeral 312b is no longer shown since the vehicle system 200 has already traveled past the segment that was represented by the discrete numeral 312b. The discrete numeral 312a is shifted in the direction of the arrow 318 representing that the vehicle system 200 is closer to the segment of the discrete numeral 312a. Further, the graphical representation 316 includes the discrete numeral 312c, which is now displayed on the display 312c representing a segment within the predetermined distance forward of the vehicle system 200.

Additionally or alternatively, the graphical representations 302 and 316 may refresh or scroll the display in discrete increments corresponding to a set distance traveled by the vehicle system 200 along the designated route, for example only, every 0.25 miles. It should be noted in other embodiments the set distance may be greater than or less than 0.25 miles.

The graphical representation 316 may include a line 310. Optionally, the line 310 may represent the grade of the designated route. For example, as the grade of the designated route increases the line 310 may have a positive slope towards an upper portion of the display 216 as shown in FIG. 3B. Alternatively, as the grade of the designated route decreases the line 310 may have a negative slope towards a lower portion of the display 216.

Figure 4:
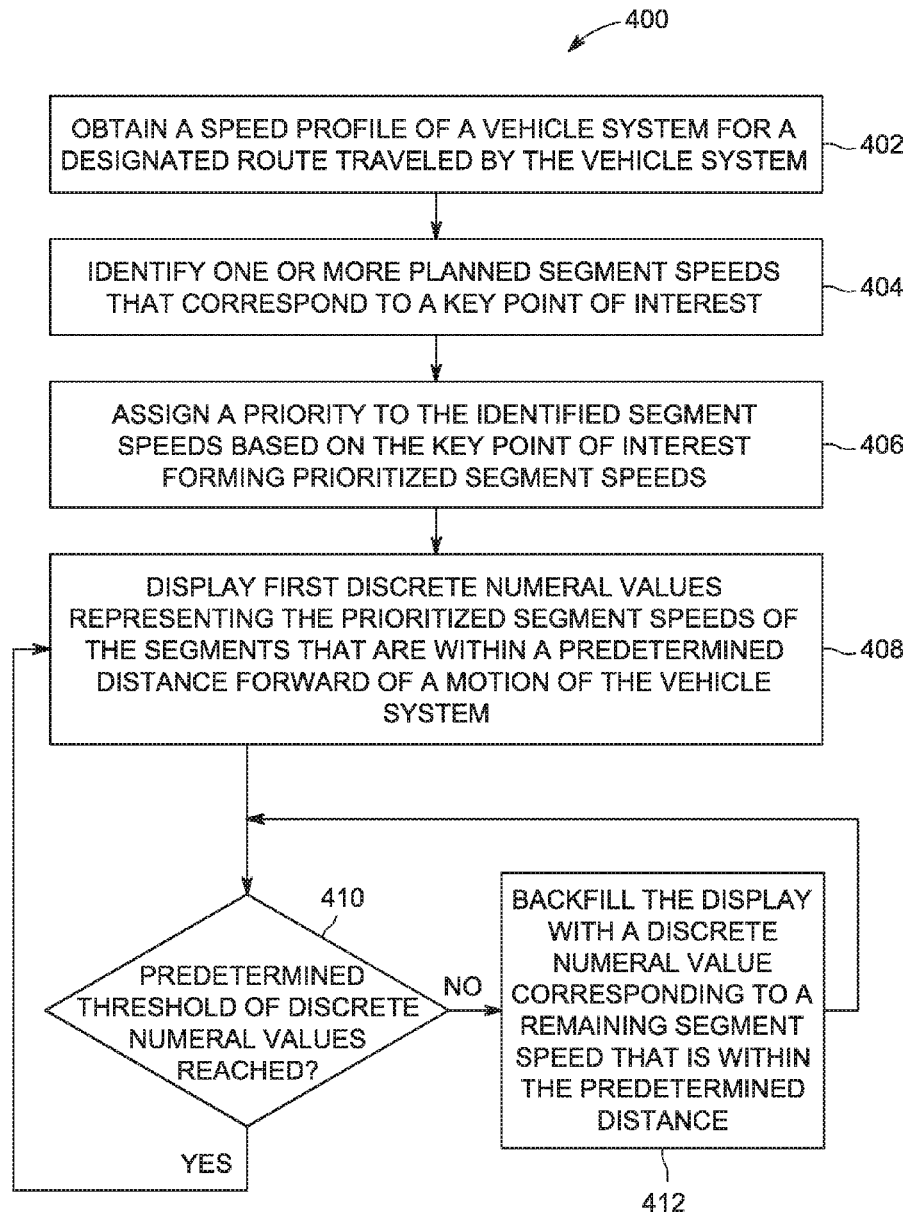
FIG. 4 is a flowchart of a method for displaying planned speed values of a vehicle system, in accordance with an embodiment.

FIG. 4 is a flowchart of a method 400 for displaying planned speed values of the vehicle system 200, in accordance with an embodiment system. The method 400, for example, may employ or be performed by structures or aspects of various embodiments (e.g., systems and/or methods) discussed herein. In various embodiments, certain operations may be omitted or added, certain operations may be combined, certain operations may be performed simultaneously, certain operations may be performed concurrently, certain operations may be split into multiple operations, certain operations may be performed in a different order, or certain operations or series of operations may be re-performed in an iterative fashion. In various embodiments, portions, aspects, and/or variations of the method 400 may be able to be used as one or more algorithms to direct hardware to perform one or more operations described herein. Furthermore, it is noted that the following is just one possible method for displaying planned speed values of the vehicle system 200. It should be noted, other methods may be used, in accordance with embodiments herein.

One or more methods may (i) obtain, with one or more processors, a speed profile of a vehicle system for a designated route traveled by the vehicle system, (ii) identify, with the one or more processors, one or more planned segment speeds that correspond to a point of interest, (iii) assign, with the one or more processors, a priority to the identified segment speeds based on the point of interest forming prioritized segment speeds, (iv) display first discrete numeral values representing the planned segment speeds of the prioritized segments that are within a predetermined distance forwards of a motion of the vehicle system; and (v) backfill the display with second discrete numeral values corresponding to remaining segment speeds that are within the predetermined distance until a predetermined threshold of discrete numeral values are reached.

At 402, a speed profile 500 of the vehicle system 200 is obtained for a designated route traveled by the vehicle system 200. FIG. 5 is an illustration of the speed profile 500, in accordance with an embodiment. The speed profile 500 may be obtained using one or more processors, for example, from the controller 208. The designated route may include a plurality of segments 504 in a consecutive order from an origin location (e.g., segment 1) to a destination location (e.g., segment 30). The segments 504 may represent a set distance within the designated route. Additionally or alternatively, the segments 504 may vary in distance with respect to each other. Optionally, the segments 504 may be based on changes planned to be executed by the energy management subsystem 214 and/or controller 208 based on the trip plan. For example, changes to the propulsion subsystem 206 (e.g., increase/decrease in throttle or tractive effort), activation/deactivation of the braking subsystem, changes in speed, location of the side rail junction 304, or the like.

The speed profile 500 includes a predicted (or planned) segment speed 502 for each of the segments 504. The planned segment speed 502 represents the predicted or planned speed of the vehicle system 200 as the vehicle system 200 travels through the segments 504. The planned segment speed 502 may be based on a speed limit or an allowed speed 508 corresponding to the segment 504 (e.g., the planned segment speed 502 may be equal to or below the allowed speed), grade information of the route 106 within the segment 504, emission limits (e.g., regulations) for traveling through the segment 504, traffic information or congestion proximate to the segment 504 or destination of the vehicle system 200, or the like.

At 404, one or more planned segment speeds 502 that correspond to a point of interest are identified. For example, the point of interest may be located at an identified segment having an allowed speed that is lower than the planned segment speed of an adjacent segment traveled by the vehicle system 200 prior to the identified segment. The controller 208 may identify which of the planned segment speeds 502 correspond to segments 504 at points of interest by determining which of the segments 504 of the speed profile 500 corresponds to an allowed speed that is lower than an adjacent planned segment speed 502, for example, as further described in a method 600.

It should be noted that the points of interest may be based, additionally or alternatively, on a grade incline of the segments surrounding the segment having the identified segment speed. For example, the controller 208 may determine that the segment speed corresponding to a segment at a crest or apex of a graded incline is a point of interest. The controller 208 may compare the grades of the segments stored on the memory 204 or defined within the trip plan to find segments with adjacent segments having different grade polarities. The controller 208 identifying planned segment speeds having segments adjacent to a positive graded or sloped segment and followed by a negative graded or sloped segment.

Additionally or alternatively, the controller 208 may determine that the segment speeds corresponding to a segment at a bottom of a graded incline is a point of interest. For example, the controller 208 may identify planned segment speeds having segments adjacent to a negative graded or sloped segment and followed by a positive graded or sloped segment.

At 406, a priority is assigned to the identified segment speeds 502 based on the point of interest to form prioritized segment speeds. For example, the controller 208 may assign a priority to the identified segment speeds 502 that corresponds to a segment at the point of interest. Optionally, the controller 208 may assign different levels or priority based on the point of interest. For example, identified segment speeds 502 that correspond to point of interests that are mechanical control zones may have a higher assigned priority than identified segment speeds 502 that correspond to point of interest that correspond to allowed speeds 508 that are lower than the segment speed of an adjacent segment.

Figure 6:
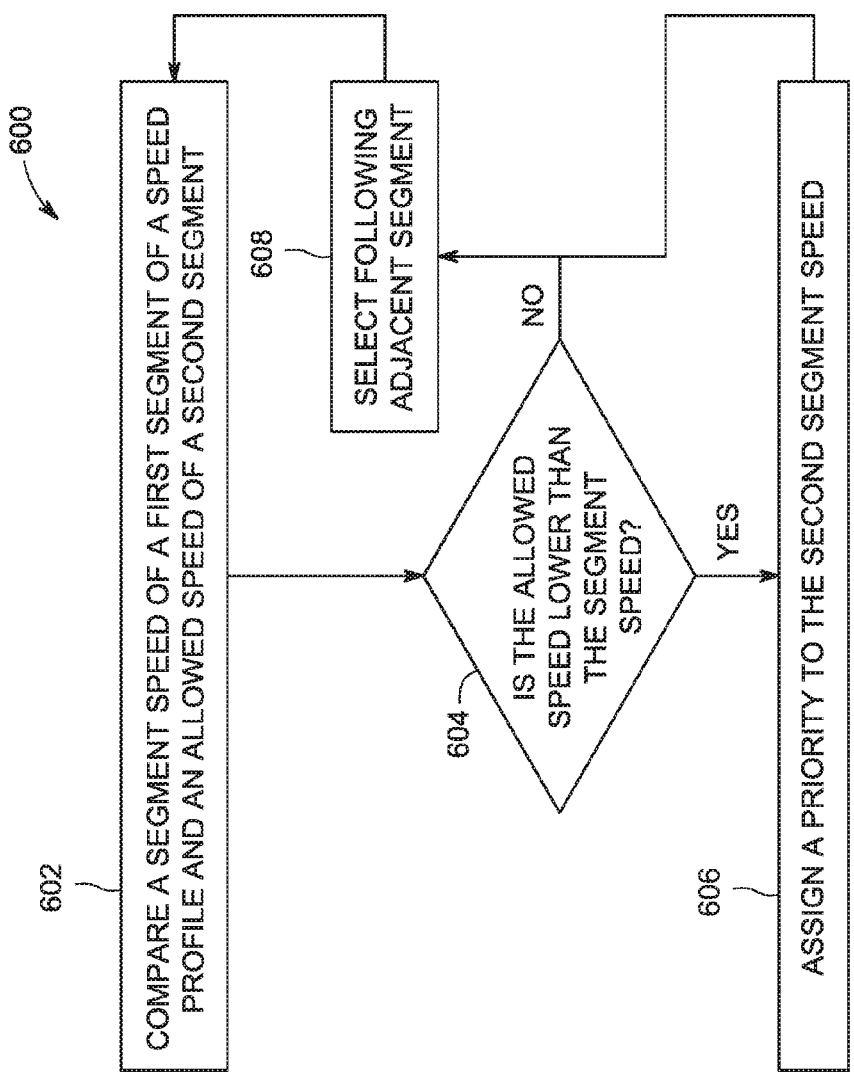
FIG. 6 is a flowchart of a method for identifying planned segment speeds that correspond to a point of interest, in accordance with an embodiment.

FIG. 6 illustrates a flow chart of a method 600 for identifying planned segment speeds that correspond to a point of interest, in accordance with an embodiment. In various embodiments, certain operations may be omitted or added, certain operations may be combined, certain operations may be performed simultaneously, certain operations may be performed concurrently, certain operations may be split into multiple operations, certain operations may be performed in a different order, or certain operations or series of operations may be re-performed in an iterative fashion. In various embodiments, portions, aspects, and/or variations of the method 600 may be able to be used as one or more algorithms to direct hardware to perform one or more operations described herein. Furthermore, it is noted that the following is just one possible method for identifying planned segment speeds that correspond to a point of interest. It should be noted, other methods may be used, in accordance with embodiments herein.

The one or more methods may (i) compare a segment speed of a first segment of a speed profile and an allowed speed of a second adjacent segment of the speed profile, (ii) determine whether the allowed speed is lower than the segment speed, and (iii) assign a priority to the segment speed of the second adjacent segment if decreased.

At 602, the method 600 compares a segment speed of a first segment of the speed profile 500 and the allowed speed 508 of a second adjacent segment of the speed profile 500. For example, the controller 208 may select the adjacent segments 1 and 2. The controller compares the planned segments speeds 502a of segment 1 and the allowed speed 508a of the segment 2. Optionally, the controller 208 may compare other adjacent segments (e.g., segment 4 and 5) of the speed profile 500. Adjacent segments are two segments that are traveled consecutively by the vehicle system 200 while traveling along the designated route of the trip plan.

At 604, the method 600 determine whether the allowed speed 508 is lower than the segment speed 502. The controller 208 may determine whether the allowed speed 508 is lower than the planned segment speed 502 by comparing the allowed speeds of a distal segment (e.g., the segment 2) and the planned segment speed 502 of a proximal segment (e.g., the segment 1) with respect to the vehicle system 200. If the allowed speed of the distal segment is lower than the planned segment speed of the proximal segment, the controller 208 may determine that the allowed speed 508 is lower than the planned segment speed 502. For example, the segment 1 has a planned segment speed 502a of 25. The segment 2 has an allowed segment speed 508a of 35. The controller 208 determines that, since 35 is greater than 25, the allowed segment speed 508b is not lower.

If the allowed segment speed 508 is not lower, for example the allowed segment speed 508 is increased or remained flat relative to the planned segment speed 502, then, at 608, another adjacent segment is selected. The controller 208 may select another adjacent segment that is adjacent to the second segmentation that is proximate to the destination location or distal to the vehicle system 200 relative to the second segmentation. For example, once the controller 208 has determined that the allowed speed 508a is not lower than the planned segment speed 502a, the controller 208 may select another adjacent segment, such as the following segment 504 next to the segment 2, the segment 3. The controller 208 may then repeat the method 600 by comparing, at 602, the adjacent segments, the segments 2 and 3. The controller 208 may repeat the method 600 by iteratively comparing each pair of adjacent segments within the speed profile until the last two segments of the speed profile 500, such as the segments 29-30, are compared.

If the allowed speed 508 is lower than the planned speed 502, then, at 606, a priority to the second segment speed is assigned. For example, the controller 208 may determine that the allowed speed 508b of 25 is lower than the planned segment speed 502b of the adjacent segment. The controller 208 assigns a priority to the segment speed 502c corresponding to the lower allowed speed 508b. Once assigned, at 606, the method 600 is repeated by the controller by selecting an adjacent segment 504 (e.g., the segment 4) at 608. The controller 208 may repeat the method 600 by iteratively comparing each pair of adjacent segments within the speed profile until the last two segments of the speed profile 500, such as the segments 29-30, are compared. For example, the controller 208 may assign a priority to the segment speeds 502c-j.

Returning to FIG. 4, at 408, first discrete numeral values 702 are displayed representing the prioritized segment speeds 502d-h of the segments that are within a predetermined distance 506 forward of a motion of the vehicle system 200. For example, the vehicle system 200 is traveling within segment 10 and will travel through the segments 504, consecutively, towards a destination within segment 30. The predetermined distance 506 may include a distance (e.g., five miles, fifteen miles) ahead of the vehicle system 200 that include segments 11-25. The controller 208 may identify the planned speeds 502d-h of segments 11-12, 14, 23-24, respectively, that are within the predetermined distance 506 and correspond to points of interest (e.g., locations of decreases in the planned speed). The controller 208 displays the planned speeds 502d-h as discrete numeral values 702 on a display 700.

Figure 7:
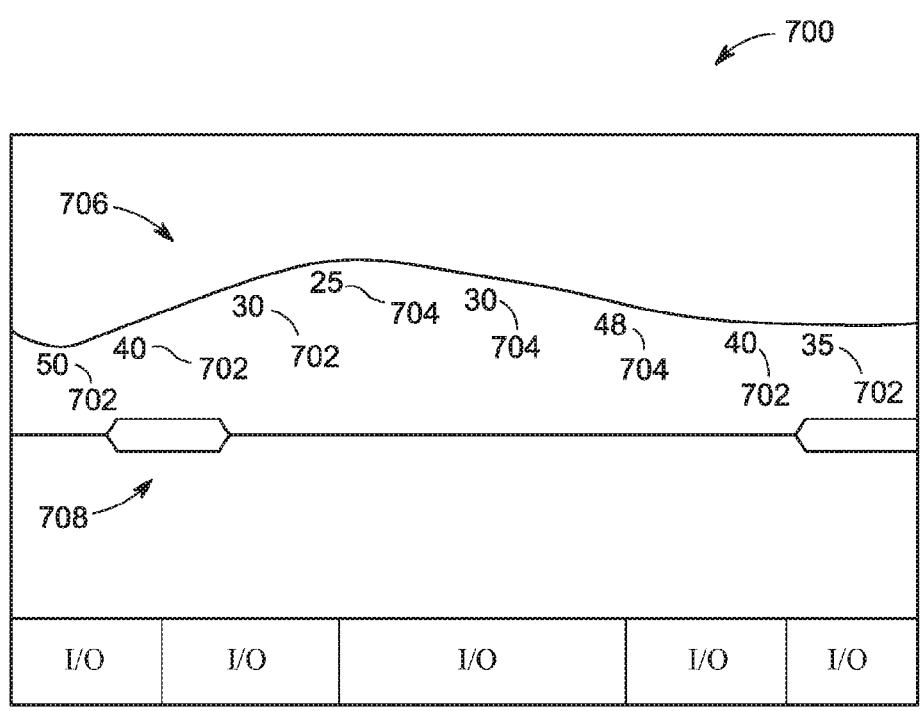
FIG. 7 is an illustration of a display of a vehicle system, in accordance with an embodiment.

FIG. 7 is an illustration of the display 700, in accordance with an embodiment. The display 700 includes a graphical representation 706 of the trip plan. Optionally, the display 700 may include a graphical representation 708 of the designated route. The graphical representations 706 and 708 display the segments 502 of the trip plan and designated route that are within the predetermined distance 506 forward of the motion of the vehicle system 200, such as segments 11-25. The controller 208 displays the first discrete numeral values 702 corresponding to the prioritized segment speeds 502d-h. The first discrete numeral values 702 may be displayed within the graphical representation 706 positioned at the corresponding segments 502 of the prioritized segment speeds 502d-i.

At 410, the method 400 determines whether the predetermined threshold of discrete numeral values is reached. The controller 208 may compare the number of discrete numerals 702 displayed on the display 700 with the predetermined threshold. For example, the predetermined threshold may be eight discrete numeral value. The controller 208 identified five first discrete numeral values 702 at 408. The controller 208 may determine that the predetermined threshold of discrete numeral values has not been reached since five discrete numeral values are less than eight.

If the predetermined threshold of discrete numeral values has not been reached, at 412, the display is backfilled with a discrete numeral value corresponding to the remaining segment speeds (e.g., 502k-m) that are within the predetermined distance 506. For example, the predetermined threshold may be eight discrete numeral values. Since the controller 208 identified five first discrete numeral values 702, the controller may add three more second discrete numeral values 704 corresponding to the remaining segment speeds (e.g., 502k-m). Optionally, the controller 208 may select the second discrete numeral values 704 based on predetermined increments from the vehicle system 200. Additionally or alternatively, the controller 208 may select the discrete numeral values 704 based on the number of segments between segments having prioritized segment speeds.

In some embodiments, the number of prioritized segment speeds 502d-h, within the predetermined distance 506, is greater than the predetermined threshold of discrete numeral values. Due to the overage of prioritized segment speeds 502d-h relative to the predetermined threshold, a subset of the prioritized segments speeds 502d-h may not be displayed Optionally, the controller 208 may determine which of the prioritized segment speed 502d-h to display based on the proximity of the prioritized segment speeds 502d-h to the vehicle system 200. For example, the controller 208 may have identified five prioritized segment speeds 502d-h. The predetermined threshold of discrete numeral values may be three. The controller 208 may select the three proximate prioritized segment speeds 502d-f that are more proximate to the vehicle system 200 relative to each of the prioritized segment speeds 502d-h. Such as, for example, the controller 208 may select the prioritized segment speeds 502d-f are closer or more proximate to the vehicle system 200 than the prioritized segment speeds 502g-h.

Optionally, the point of interest may be based on a beginning or end of a manual control zone. For example, the controller 208 may indicate on the display segments where the energy management subsystem 214 may not control the tractive effort of the propulsion subsystem 206 or braking subsystem.

Optionally, the first and second discrete numerical values 702 and 704 are not displayed within a predetermined minimum distance from the vehicle system 200 such that the graphical representation 706 of the trip plan displays numerical values representing segments located between the predetermined minimum and the predetermined distance from the forwards motion of the vehicle system 200.

Optionally, the point of interest may be further identified based on a distance from the vehicle system 200. For example, the controller 208 may identify points of interest that are within the predetermined distance from the vehicle system 200.

In one example of the inventive subject matter, a method includes obtaining, with one or more processors, a speed profile of a vehicle system for a designated route traveled by the vehicle system, the designated route includes a plurality of segments, wherein the speed profile includes a planned segment speed for one or more of the segments. The method includes identifying, with the one or more processors, one or more planned segment speeds that correspond to a point of interest. The method includes assigning, with the one or more processors, a priority to the identified segment speeds based on the point of interest forming prioritized segment speeds. The method includes displaying first discrete numeral values representing the planned segment speeds of the prioritized segments that are within a predetermined distance forward of a motion of the vehicle system. The method includes backfilling the display with second discrete numeral values corresponding to remaining segment speeds that are within the predetermined distance until a predetermined threshold of discrete numeral values are reached.

In one aspect, the point of interest of the method may correspond to a second segment having an allowed segment speed lower than the planned segment speed of an adjacent first segment that is traveled by the vehicle system before the second segment.

In one aspect, the point of interest of the method may be based on a grade incline of the segments surrounding the segment having the identified planned segment speed.

In one aspect, the method may include adjusting the predetermined distance based on an instantaneous speed of the vehicle system.

In one aspect, the first discrete numeral values of the method may be at least one of a different color with respect to the second discrete numeral values or flashing.

In one aspect, the point of interest of the method may be based on a beginning or end of a manual control zone.

In one aspect, the backfilled second discrete numerical values of the method may be at predetermined increments from the vehicle system.

In one aspect, the speed profile of the method may be obtained off board the vehicle system.

In one aspect, the method may include generating a trip plan that includes the speed profile of the vehicle system.

In one aspect, the discrete numerical values of the method may not be within a predetermined minimum distance from the vehicle system.

In one example of the inventive subject matter, a system includes a display and a non-transitory memory configured to store a speed profile for a designated route, the designated route includes a plurality of segments, wherein the speed profile includes a planned segment speed for each segment. The system may include a controller having one or more processors, wherein the controller is programmed to operation, in response to instructions stored on the non-transitory memory. The controller is programmed to identify one or more planned segments speeds from the speed profile that corresponds to a point of interest. The controller is programmed to assign a priority to the identified segment seeds based on the point of interest forming prioritized segment speed. The controller is programmed to instruct the display to display first discrete numeral values representing the planned segment speeds of the prioritized segments that are within a predetermined distance forward of a motion of the vehicle system. The controller is programmed to backfilling the display with second discrete numeral values corresponding to remaining segment speeds that are within the predetermined distance until a predetermined threshold of discrete numeral values are reached.

In one aspect, the point of interest of the system may correspond to a second segment having an allowed segment speed lower than the planned segment speed of an adjacent first segment that is traveled by the vehicle system before the second segment.

In one aspect, the point of interest of the system may be based on a grade incline of the segments surrounding the segment having the identified planned segment speed.

In one aspect, the controller of the system may be further programmed to adjust the predetermined distance based on an instantaneous speed of the vehicle system.

In one aspect, the first discrete numeral values of the system may be at least one of a different color with respect to the second discrete numeral values or flashing.

In one aspect, the point of interest of the system may be based on a beginning or end of a manual control zone.

In one aspect, the backfilled second discrete numerical values of the system may be at predetermined increments from the vehicle system.

In one aspect, the speed profile of the system may be obtained off board the vehicle system.

In one aspect, the controller of the system may be further programmed to generate a trip plan that includes the speed profile of the vehicle system.

In one example of the inventive subject matter, a method includes receiving, using one or more processors, a trip plan that includes a speed profile for a vehicle system. The speed profile includes two or more segments each having a planned segment speed and an allowed segment speed. The method includes iteratively comparing, using the one or more processors, the planned segment speed of a first segment and the allowed segment speed of an adjacent second segment to identify segments having allowed segment speeds lower than the planned speed of an adjacent segment. The method includes assigning, using the one or more processors, a priority to the planned segment speeds of the identified segments. The method includes displaying, using the one or more processors, the prioritized planned segment speeds as discrete numerals on a graphical representation of the trip plan on a display. The method includes backfilling, using the one or more processors, the graphical representation of the trip plan with the remaining planned segment speeds of the speed profile until a predetermined threshold is reached.

In another embodiment, a method comprises receiving, using one or more processors, a trip plan that includes a speed profile for a vehicle system, wherein the speed profile includes plural segments having respective planned segment speeds and respective allowed segment speeds. The method further comprises iteratively comparing, using the one or more processors, for each of at least one adjacent pair of the plural segments, the planned segment speed of a first segment of the adjacent pair and the allowed segment speed of an adjacent second segment of the adjacent pair, to identify one or more identified segments of the plural segments having allowed segment speeds lower than the planned speeds of a respective one or more adjacent segments of the plural segments that are adjacent to the one or more identified segments. The method further comprises designating, using the one or more processors, one or more of the planned segment speeds of the identified segments as prioritized planned segment speeds; displaying, using the one or more processors, the prioritized planned segment speeds as discrete numerals on a graphical representation of the trip plan on a display; and displaying, using the one or more processors, the graphical representation of the trip plan with remaining ones of the planned segment speeds of the speed profile, which are not the prioritized planned segment speeds, until a predetermined threshold is reached.

In any of the systems and methods described herein, the system or method may include automatic or other control of a vehicle system along a route, based at least in part on one or more of the trip plan or the displayed speeds. Vehicle control may include changing a vehicle speed from a first non-zero speed (vehicle is moving at the first speed) to a second, different non-zero speed (vehicle is moving at the second speed), from a zero speed (vehicle is not moving) to a non-zero speed, and/or from a non-zero speed to a zero speed. In an embodiment, a system or method includes automatic control of a vehicle system along a route according to the trip plan, during a first designated or other part of the route, and manual control of the vehicle system according to the displayed speeds during a second, different designated or other part of the route.

As used herein, the terms "module," "system," "device," or "unit," may include a hardware and/or software system and circuitry that operates to perform one or more functions. For example, a module, unit, device, or system may include a computer processor, controller, or other logic-based device that performs operations based on instructions stored on a tangible and non-transitory computer readable storage medium, such as a computer memory. Alternatively, a module, unit, device, or system may include a hard-wired device that performs operations based on hard-wired logic and circuitry of the device. The modules, units, or systems shown in the attached figures may represent the hardware and circuitry that operates based on software or hardwired instructions, the software that directs hardware to perform the operations, or a combination thereof. The modules, systems, devices, or units can include or represent hardware circuits or circuitry that include and/or are connected with one or more processors, such as one or computer microprocessors.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter, including the best mode, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, or the like). Similarly, the programs may be stand alone programs, may be incorporated as subroutines in an operating system, may be functions in an installed software package, or the like. The various embodiments are not limited to the arrangements and instrumentality shown in the drawings.

As used herein, an element or step recited in the singular and proceeded with the word "a" or "an" should be understood as not excluding plural of said elements or operations, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A method comprising:
   obtaining, with one or more processors, a speed profile of a rail vehicle system for a route traveled by the rail vehicle system, the route includes a plurality of segments, wherein the speed profile includes planned segment speeds for one or more of the segments;
   identifying, with the one or more processors, the planned segment speeds that correspond to a point of interest;
   assigning, with the one or more processors, respective priorities to the planned segment speeds that are identified based on the point of interest to form prioritized segment speeds and non-prioritized segment speeds, wherein the prioritized segment speeds represent at least one of a change in segment speed, a grade incline of the route, or a manual control zone;
   displaying, on a display, first discrete numeral values representing the prioritized segment speeds that are within a predetermined distance forward of a motion of the rail vehicle system;
   determining second discrete numeral values corresponding to the non-prioritized segment speeds;
   displaying, on the display, a subset of the second discrete numeral values, wherein a number of the first and second discrete numeral values displayed on the display is based on a predetermined threshold of discrete numeral values, and the subset of the second discrete numeral values is displayed if a number of the first discrete numeral values is less than the predetermined threshold of discrete numeral values; and
altering a tractive effort of the rail vehicle system to adjust the predetermined distance.

2. The method of claim 1, wherein the change in segment speed corresponds to a second segment of the plurality of segments having an allowed segment speed lower than the planned segment speed of an adjacent first segment of the plurality of segments that is travelled by the rail vehicle system before the second segment.

3. The method of claim 1, wherein the amount of the second discrete numeral values that define the subset displayed is further based on a distance from the forward motion of the rail vehicle system.

4. The method of claim 1, wherein the tractive effort is adjusted automatically based on at least one of the first discrete numeral values or the second discrete numeral values.

5. The method of claim 1, wherein the first discrete numeral values are displayed at least one of a different color with respect to the second discrete numeral values or flashing.

6. The method of claim 1, further comprising assigning a level of priority to the prioritized segment speeds based on a type of the point of interest.

7. The method of claim 1, wherein the second discrete numeral values are backfilled onto the display.

8. The method of claim 1, wherein the speed profile is obtained off board the rail vehicle system.

9. The method of claim 1, further comprising generating a trip plan that includes the speed profile of the rail vehicle system.

10. The method of claim 1, wherein the second discrete numeral values are at predetermined increments from a position on the display corresponding to a location of the rail vehicle system.

11. A system comprising:
a display;
a non-transitory memory configured to store a speed profile for a designated route, the designated route includes a plurality of segments, wherein the speed profile includes planned segment speeds for each segment;
a controller having one or more processors, wherein the controller is programmed to operation, in response to instructions stored on the non-transitory memory to:
identify the planned segments speeds from the speed profile that corresponds to a point of interest;
assign respective priorities to the planned segment speeds that correspond to the point of interest to form prioritized segment speeds, wherein the prioritized segment speeds represents at least one of a change in segment speed, a grade incline of the route, or a manual control zone;
instruct the display to display first discrete numeral values representing the planned segment speeds of the prioritized segments that are within a predetermined distance forward of a motion of the rail vehicle system;
determining second discrete numeral values corresponding to the non-prioritized segment speeds;
instruct the display to display a subset of the second discrete numeral values, wherein a number of the first and second discrete numeral values displayed on the display is based on a predetermined threshold of discrete numeral values, and the subset of the second discrete numeral values is displayed if a number of the first discrete numeral values is less than the predetermined threshold of discrete numeral values; and
alter a tractive effort of the rail vehicle system to adjust the predetermined distance.

12. The system of claim 11, wherein the change in segment speed corresponds to a second segment of the plurality of segments having an allowed segment speed lower than the planned segment speed of an adjacent first segment of the plurality of segments that is travelled by the rail vehicle system before the second segment.

13. The system of claim 11, wherein the amount of the second discrete numeral values that define the subset displayed is further based on a distance from the forward motion of the rail vehicle system.

14. The system of claim 11, wherein the controller is further programmed to alter the tractive effort automatically based on at least one of the first discrete numeral values or the second discrete numeral values.

15. The system of claim 11, wherein the first discrete numeral values are displayed at least one of a different color with respect to the second discrete numeral values or flashing.

16. The system of claim 11, wherein the controller is further programmed to assign a level of priority to the prioritized segments based on a type of the point of interest.

17. The system of claim 11, wherein the second discrete numeral values are backfilled onto the display.

18. The system of claim 11, wherein the speed profile is obtained off board the rail vehicle system.

19. The system of claim 11, wherein the controller is further programmed to generate a trip plan that includes the speed profile of the rail vehicle system.

20. A method comprising:
receiving, using one or more processors, a trip plan that includes a speed profile for a rail vehicle system, wherein the speed profile includes two or more segments each having a planned segment speed and an allowed segment speed;
iteratively comparing, using the one or more processors, the planned segment speed of a first segment and the allowed segment speed of an adjacent second segment to identify segments having allowed segment speeds lower than the planned speed of an adjacent segment;
assigning, using the one or more processors, a priority to the planned segment speeds of the identified segments;
displaying, using the one or more processors, the prioritized planned segment speeds within a predetermined distance forward of a motion of the rail vehicle system as discrete numerals on a graphical representation of the trip plan on a display;
backfilling, using the one or more processors, the graphical representation of the trip plan with a subset of the remaining planned segment speeds of the speed profile, wherein an amount of the remaining planned segment speeds of the subset are backfilled based on a predetermined threshold, and the subset of the remaining planned segment speeds is displayed if a number of the prioritized planned segment speeds is less than the predetermined threshold; and automatically altering a tractive effort of the rail vehicle system based on one of the prioritized planned segment speeds to adjust the predetermined distance.

* * * * *